(12) United States Patent
Mase et al.

(10) Patent No.: US 11,654,901 B2
(45) Date of Patent: May 23, 2023

(54) DRIVING ASSISTANCE APPARATUS

(71) Applicant: TOYOTA JIDOSHA KABUSHIKI KAISHA, Toyota (JP)

(72) Inventors: Yusuke Mase, Nagoya (JP); Hideyuki Usui, Inazawa (JP); Yoshiaki Moriya, Susono (JP); Jiro Ohachi, Shizuoka-ken (JP); Yuki Tomiku, Susono (JP); Yuji Misumi, Toyota (JP); Tetsuhiro Narita, Toyota (JP); Masakatsu Onitsuka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 17/132,108

(22) Filed: Dec. 23, 2020

(65) Prior Publication Data
US 2021/0221365 A1 Jul. 22, 2021

(30) Foreign Application Priority Data

Jan. 20, 2020 (JP) .............................. JP2020-006487

(51) Int. Cl.
*B60W 30/09* (2012.01)
*B60W 10/04* (2006.01)
*B60W 10/06* (2006.01)
*B60W 10/184* (2012.01)

(52) U.S. Cl.
CPC ............ *B60W 30/09* (2013.01); *B60W 10/04* (2013.01); *B60W 10/06* (2013.01); *B60W 10/184* (2013.01)

(58) Field of Classification Search
None
See application file for complete search history.

(56) References Cited

U.S. PATENT DOCUMENTS

| 10,037,683 B1* | 7/2018 | Hosey ..................... G01S 19/52 |
| 2012/0209488 A1* | 8/2012 | Nagaya ................. B60W 10/06 701/70 |
| 2015/0112552 A1* | 4/2015 | Okamura ............ B60R 21/0132 701/1 |
| 2015/0360655 A1* | 12/2015 | Odate ................... B60W 10/18 701/70 |
| 2017/0217429 A1 | 8/2017 | Shioe |
| 2020/0324759 A1* | 10/2020 | Sakuma ............... G06V 20/597 |
| 2021/0072743 A1* | 3/2021 | Otaki ................. G01C 21/3863 |

FOREIGN PATENT DOCUMENTS

| JP | 2012-166631 A | 9/2012 |
| JP | 2013-082298 A | 5/2013 |
| JP | 2016002868 A | 1/2016 |
| JP | 2016-117319 A | 6/2016 |
| JP | 2017-132390 A | 8/2017 |

* cited by examiner

Primary Examiner — Russell Frejd
Assistant Examiner — Ana D Thomas
(74) Attorney, Agent, or Firm — Dickinson Wright, PLLC

(57) ABSTRACT

A control unit determines whether a rapid acceleration pedal depression operation has been performed. The control unit determines whether a low impact collision has occurred. When it is determined that the rapid acceleration pedal depression operation has been performed and the low impact collision has occurred, the control unit executes a secondary collision damage mitigation control.
Consequently, the secondary collision damage mitigation control can be appropriately executed even when a collision that does not cause an air bag to be inflated has occurred.

5 Claims, 7 Drawing Sheets

DRIVING ASSISTANCE APPARATUS

TECHNICAL FIELD

The present disclosure relates to a driving assistance apparatus configured to perform a secondary collision damage mitigation/reduction control when a low impact collision of a host vehicle is detected.

BACKGROUND

There has been a known apparatus configured to automatically apply brakes when an air bag is inflated due to a detection of a collision of a host vehicle with a first object, so as to mitigate (or avoid) a secondary collision damage. The secondary collision is another collision of the host vehicle with a second object that is different from the first object. The secondary collision occurs due to a movement of the host vehicle after the collision with the first object.

Another conventional vehicle control apparatus (hereinafter, referred to as a "conventional apparatus") is disclosed in Japanese Patent Application Laid-Open (kokai) No. 2016-2868. The conventional apparatus is configured to increase braking force when a low impact collision that does not cause the air bag to be inflated is detected and a brake pedal operation amount is not sufficiently large.

In addition, when the low impact collision is detected, the conventional apparatus decreases a throttle valve opening degree in such a manner that the throttle valve opening degree coincides with a degree obtained by subtracting a throttle valve opening degree decreasing amount from the current throttle vale opening degree if an acceleration pedal operation is performed, so as to reduce/decrease drive force of the vehicle (as compared to a normal driving state).

When the low impact collision has occurred, the driver may perform some driving operation in order to avoid the secondary collision or to mitigate the secondary collision damage. If a secondary collision damage mitigation control including a brake force control and/or a drive force control are carried out in such a case, the mitigation control may interfere with the driver's driving operation for avoiding the secondary collision or for mitigating the secondary collision damage. In view of this, it may not be preferable to allow the secondary collision damage mitigation control to be performed when the low impact collision that does not cause the air bag to be inflated has occurred. Nonetheless, the conventional apparatus carries out the secondary collision damage mitigation control whenever the low impact collision is detected (without requiring another condition to be satisfied for performing the secondary collision damage mitigation control). Accordingly, the conventional apparatus cannot solve the above described problem.

SUMMARY

The present disclosure has been made to cope with the problem described above. One of the objectives of the present disclosure is to provide a driving assistance apparatus that is capable of appropriately performing the secondary collision damage mitigation control when the low impact collision has occurred.

A driving assistance apparatus according to the present disclosure comprises:

an acceleration operation amount sensor (30) configured to detect an operation amount of an acceleration pedal;

an acceleration sensor (20) configured to detect an acceleration of the host vehicle; and a control unit (10) configured to:

obtain an acceleration pedal operation indicative value based on the operation amount of the acceleration pedal;

determine that a rapid acceleration pedal depression operation has been performed when the acceleration pedal operation indicative value satisfies a rapid acceleration pedal depression operation condition for determining an occurrence of the rapid acceleration pedal depression operation;

obtain, based on the acceleration, a collision indicative value indicative of an impact caused by a collision of the host vehicle with an object;

determine that a low impact collision has occurred when the collision indicative value satisfies a low impact collision determining condition that is satisfied when the collision indicative value becomes larger than a low impact collision threshold, wherein an air bag of the host vehicle is not caused to be inflated when the collision indicative value becomes larger than the low impact collision threshold; and execute a secondary collision damage mitigation control when it has been determined that the rapid acceleration pedal depression operation has been performed and the low impact collision has occurred, wherein the secondary collision damage mitigation control includes at least one of a control to apply brake force to the host vehicle and a control to suppress drive force applied to the host vehicle.

In other words, the driving assistance apparatus according to the present disclosure comprises:

a rapid acceleration pedal depression operation determining section (11) for obtaining an acceleration pedal operation indicative value indicative of degree regarding depression operation to the acceleration pedal, and for determining that the rapid acceleration pedal depression operation has been performed when the acceleration pedal operation indicative value satisfies a rapid acceleration pedal depression operation condition for determining an occurrence of the rapid acceleration pedal depression operation;

a low impact collision determining section (12) for obtaining a collision indicative value indicative of an impact caused by a collision of the host vehicle with an object, and for determining that a low impact collision has occurred when the collision indicative value satisfies a low impact collision determining condition that is satisfied when the collision indicative value becomes larger than a low impact collision threshold, wherein an air bag of the host vehicle is not caused to be inflated when the collision indicative value becomes larger than the low impact collision threshold; and a secondary collision damage mitigation control section (13) for executing a secondary collision damage mitigation control when it has been determined that the rapid acceleration pedal depression operation has been performed by the rapid acceleration pedal depression operation determining section and it has been determined that the low impact collision has occurred by the low impact collision determining section, wherein the secondary collision damage mitigation control includes at least one of a control to apply brake force to the host vehicle and a control to suppress drive force applied to the host vehicle.

When the rapid acceleration pedal depression operation is detected, it can be inferred that the acceleration pedal depression operation is a mistaken pedal operation, namely, is the pedal operation occurred when the driver mistakenly depresses/presses the acceleration pedal instead of the brake pedal despite that the driver intends to depress/press the brake pedal. In such a case, the mistaken pedal operation may cause the host vehicle to collide with an obstacle (e.g., a guard rail) with higher possibility than a normal driving case. In addition, in such a case, the driver mistakenly depresses the acceleration pedal instead of the brake pedal, he/she may continue depressing the acceleration pedal even after the host vehicle collides with the obstacle.

Accordingly, when the mistaken pedal operation has been occurring, it can be inferred that it is relatively difficult for the driver to perform an appropriate operation to avoid the secondary collision damage and/or to mitigate the secondary collision damage. Therefore, it is preferable that the secondary collision damage mitigation control be performed for not only a collision that causes the air bag(s) to be inflated but also for a low impact collision that does not cause the air bag(s) to be inflated in such a case.

In view of the above, the driving assistance apparatus according to the present disclosure comprises the rapid acceleration pedal depression operation determining section, the low impact collision determining section, and the secondary collision damage mitigation control section.

The rapid acceleration pedal depression operation determining section (11) obtains the acceleration pedal operation indicative value indicative of degree regarding depression operation to the acceleration pedal, and determines that the rapid acceleration pedal depression operation has been performed when the acceleration pedal operation indicative value satisfies the rapid acceleration pedal depression operation condition that is a condition for determining an occurrence of the rapid acceleration pedal depression operation.

For example, the rapid acceleration pedal depression operation determining section may obtain, as the acceleration pedal operation indicative value, an acceleration pedal operation amount (acceleration opening degree) and an accelerator operation amount change rate. The rapid acceleration pedal depression operation determining section may determine whether the rapid acceleration pedal depression operation condition is satisfied by them, wherein the rapid acceleration pedal depression operation condition is satisfied when the acceleration pedal operation amount is larger than an operation threshold and the accelerator operation amount change rate is larger than an operation amount change rate threshold. The rapid acceleration pedal depression operation determining section may determine that the rapid acceleration pedal depression operation has been performed when the acceleration pedal operation indicative value satisfies the rapid acceleration pedal depression operation condition.

The low impact collision determining section obtains the collision indicative value indicative of a degree of an impact caused by a collision of the host vehicle with an object, and determines that the low impact collision has occurred when the collision indicative value satisfies the low impact collision determining condition that is satisfied when the collision indicative value becomes larger than the low impact collision threshold. The air bag of the host vehicle is not caused to be inflated when the collision indicative value becomes larger than the low impact collision threshold. In other words, the low impact collision determining section determines whether or not the collision indicative value satisfies the low impact collision determining condition, and determines that the low impact collision has occurred when the collision indicative value satisfies the low impact collision determining condition. For example, the collision indicative value may be an acceleration of a vehicle body of the host vehicle, and/or a value varying depending on the acceleration.

The secondary collision damage mitigation control section executes the secondary collision damage mitigation control, when it has been determined that the rapid acceleration pedal depression operation has been performed by the rapid acceleration pedal depression operation determining section and it has been determined that the low impact collision has occurred by the low impact collision determining section. The secondary collision damage mitigation control may be the control to apply brake force to the host vehicle and/or the control to suppress drive force applied to the host vehicle. Accordingly, the secondary collision damage can be mitigated in the case where the mistaken pedal operation has been performed wherein it can be inferred that the driver is unlikely to operate to avoid the secondary collision when the collision that does not cause the air bag to be inflated has occurred.

Consequently, the driving assistance apparatus according to the present disclosure can broaden "the cases (chances) where the secondary collision damage mitigation control is carried out" to "the cases where the low impact collision has occurred".

It should be noted that a time point (timing) at which the low impact collision occurs does not necessarily coincide with a time point (timing) at which the rapid acceleration pedal depression operation is performed. For example, the low impact collision may occur due to the occurrence of the rapid acceleration pedal depression operation by the driver. Alternatively, the driver may perform the rapid acceleration pedal depression operation (the mistaken pedal operation) when he/she is startled at the low impact collision. In view of the above, the secondary collision damage mitigation control section may be configured to execute the secondary collision damage mitigation control, when the occurrence of the rapid acceleration pedal depression operation and the occurrence of the low impact collision are determined to happen at the substantially same time.

In some embodiment, the driving assistance apparatus of the present disclosure may comprise a rear direction monitoring sensor configured to obtain information on a following vehicle that is running behind the host vehicle. In this case, the control unit may be configured to, when executing the secondary collision damage mitigation control, apply the brake force to the host vehicle if it is determined, based on the information obtained by the rear direction monitoring sensor, that the following vehicle is not present in a proximity area that is a predetermined rear area of the host vehicle; and suppress the drive force applied to the host vehicle without applying the brake force to the host vehicle, if it is determined, based on the information obtained by the rear direction monitoring sensor, that the following vehicle is present in the proximity area.

In other words, the driving assistance apparatus of the present disclosure may include a following vehicle detecting section (100) configured to detect a following vehicle that is traveling behind the host vehicle. The secondary collision damage mitigation control section executes the secondary collision damage mitigation control so as to:

apply the brake force to the host vehicle (S18) when the following vehicle is not detected in the proximity area that is the predetermined rear area of the host vehicle by the following vehicle detecting section (S16: No); and suppress the drive force applied to the host vehicle without applying the brake force to the host vehicle (S17), when the following vehicle is detected in the proximity area by the following vehicle detecting section (S16: Yes).

For example, when the brake force is generated by the secondary collision damage mitigation control in a case where an inter-vehicle distance between the host vehicle and the following vehicle is short, the following vehicle may approach the host vehicle too closely. In view of this, the following vehicle detecting section detects the following vehicle that is traveling behind the host vehicle. The secondary collision damage mitigation control section, when executing the secondary collision damage mitigation control, is configured to apply the brake force to the host vehicle when the following vehicle is not detected in the proximity area that is the predetermined rear area of the host vehicle by the following vehicle detecting section, and suppress the drive force applied to the host vehicle without applying the brake force to the host vehicle when the following vehicle is detected in the proximity area by the following vehicle detecting section. Accordingly, the following vehicle may be prevented from approaching the host vehicle too closely.

The proximity area is, for example, an area within a set distance from the host vehicle in the rear direction. In other words, when the following vehicle is present within the proximity area, the inter-vehicle distance between the host vehicle and the following vehicle is equal to or shorter than the set distance. For example, the set distance may preferably be set to a distance which is longer as the vehicle speed of the host vehicle is higher.

In some embodiment, the driving assistance apparatus of the present disclosure may comprise a communication module configured to communicate with a center outside of the host vehicle, and wherein, the control unit is configured to:

maintain the host vehicle at a stopped state after the host vehicle is stopped due to the secondary collision damage mitigation control;

notify the center of a state of the host vehicle through the communication module after the host vehicle is stopped due to the secondary collision damage mitigation control; and cancel maintaining the host vehicle at the stopped state upon a reception of a canceling instruction transmitted from the center.

In other words, the driving assistance apparatus of the present disclosure may include:

a stopping and holding section (S22) for maintaining the host vehicle at the stopped state after the host vehicle is stopped by the execution of the secondary collision damage mitigation control;

a notification section (S23) for notifying a center (200) that is able to communicate with the host vehicle through radio communication of a state of the host vehicle after the execution of the secondary collision damage mitigation control; and a cancelling section (S25) for receiving a canceling instruction from the center and for canceling maintaining the host vehicle at the stopped state (S25).

The rapid acceleration pedal depression operation may sometimes be the mistaken pedal operation by an aged driver. Such a driver sometimes panics and continues depressing the acceleration pedal if he/she has performed the mistaken pedal operation. If the acceleration pedal continues to be depressed when and after the secondary collision damage mitigation control is finished, the host vehicle may rapidly start to accelerate.

In view of this, in some embodiment, the driving assistance apparatus of the present disclosure, the stopping and holding section forcibly (i.e., without requiring driver's operation) maintains the host vehicle at the stopped state after the host vehicle is stopped by the execution of the secondary collision damage mitigation control. Maintaining the host vehicle at the stopped state means applying brake force to the host vehicle in such a manner that the host vehicle neither moves forward nor moves backward. After the secondary collision damage mitigation control is executed, the notification section notifies the center that is able to communicate with the host vehicle through radio communication of the state of the host vehicle. The center is a communication device that is able to communicate with the host vehicle through radio communication so as to assist the driver.

For example, when the state of the host vehicle is notified, an operator at the center has a conversation with the driver of the host vehicle. When the operator confirms that the driver of the host vehicle is in the state of being in control, the canceling instruction is transmitted from the center. The cancelling section cancels maintaining the host vehicle at the stopped state upon reception of the canceling instruction. Consequently, the host vehicle can starts moving safely.

Notably, in the above description, in order to facilitate understanding of the present disclosure, the constituent elements or the like of the disclosure corresponding to those of the embodiments of the disclosure which will be described later are accompanied by parenthesized symbols which are used in the embodiments. However, the constituent elements of the disclosure are not limited to those in the embodiments defined by the symbols.

DETAILED DESCRIPTION

A driving assistance apparatus (hereinafter, sometimes referred to as a "present apparatus") according to an embodiment of the present disclosure will be described with reference to the drawings.

Figure 1:
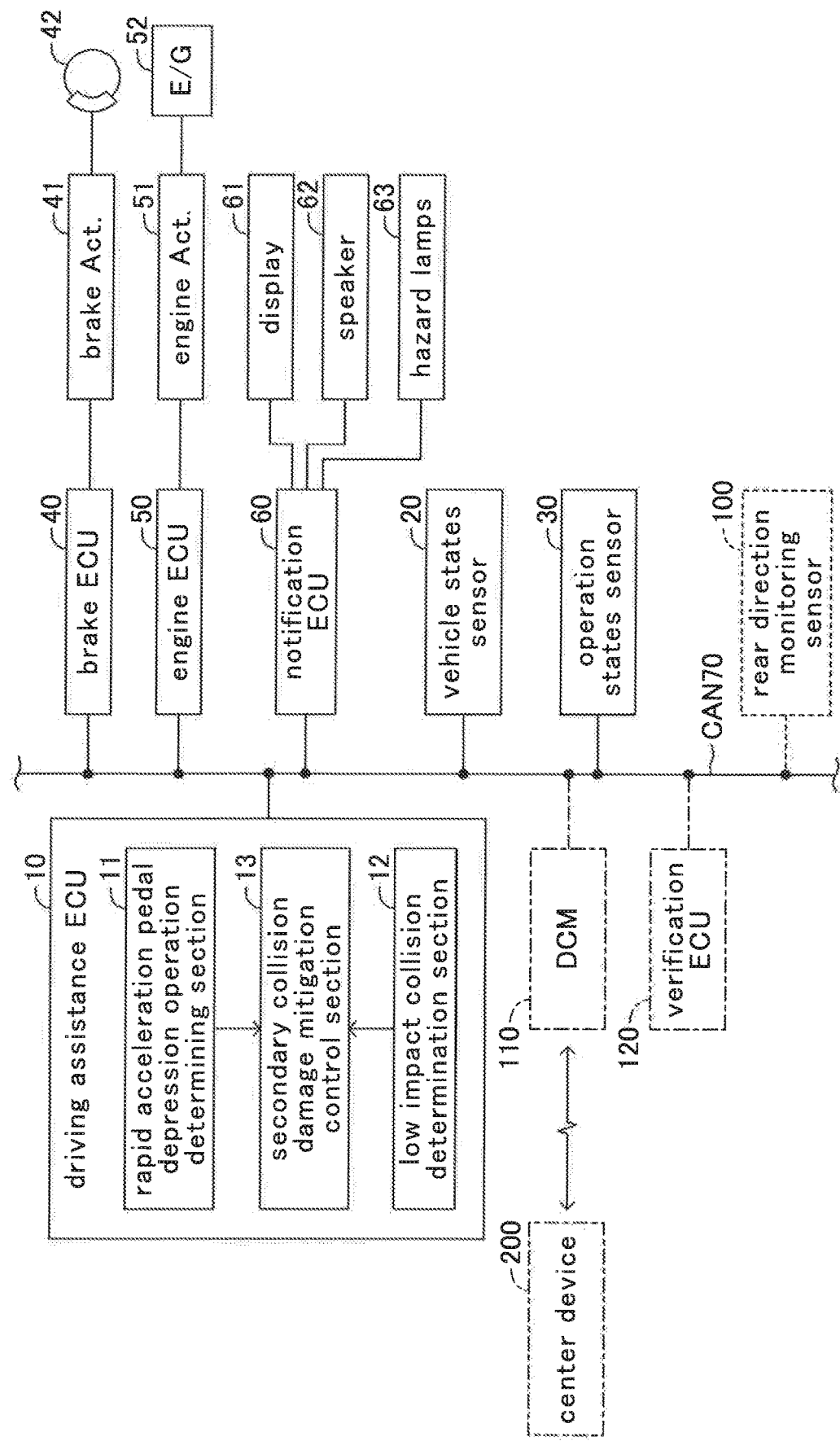
FIG. 1 is a schematic diagram of a driving assistance apparatus according to an embodiment of the present disclosure.

The present apparatus is applied to a vehicle that is sometimes referred to as a "host vehicle" in order to be distinguished from other vehicles. As shown in FIG. 1, the present apparatus comprises a driving assistance ECU 10, a vehicle states sensor 20, an operation states sensor 30, a brake ECU 40, an engine ECU 50, and a notification ECU 60.

These ECUs are Electronic Control Units. The ECUs are connected with each other through a CAN (Controller Area Network) 70 so that each of them can transmit information to and receive information from the other any one of the ECUs. Each of the ECUs comprises, as a main component, a microcomputer that includes a CPU, a ROM, a RAM, a nonvolatile memory, and an interface I/F. The CPU achieves various functions through executing instructions (i.e., programs/routines) stored in the ROM. Some or all of those ECUs may be integrated into a single ECU.

The driving assistance ECU 10 is a main control device to perform driving assistance controls (or driver assistance controls to assist a driver of the host vehicle to drive the host vehicle) that includes a "secondary collision damage mitigation control" described later. The secondary collision damage mitigation control is a control to automatically apply braking force to the host vehicle so as to mitigate (or avoid) a secondary collision damage when a low impact collision of the host vehicle is detected and a rapid acceleration pedal depression operation is detected. The driving assistance ECU 10 may include a plurality of ECUs.

The rapid acceleration pedal depression operation means an operation onto the acceleration pedal to rapidly and deeply depress the acceleration pedal. The rapid acceleration pedal depression operation typically occurs when the driver mistakenly depresses/presses the acceleration pedal instead of the brake pedal despite that the driver intends to depress/press the brake pedal. Hereinafter, the acceleration pedal depression operation of when the driver strongly/deeply and mistakenly depresses/presses the acceleration pedal instead of the brake pedal despite that the driver intends to depress/press the brake pedal is referred to as a "mistaken pedal operation". Accordingly, when the rapid acceleration pedal depression operation typically is detected, it can be presumed that the detected rapid acceleration pedal depression operation is the mistaken pedal operation.

The low impact collision includes/means a collision (low level collision) that does not cause the air bag of the host vehicle to be inflated. The secondary collision is another collision of the host vehicle with a second object that is different from a first object with which the host vehicle collided firstly, and occurs due to a movement of the host vehicle after the collision between the host vehicle and the first object.

The host vehicle in which the present apparatus is installed comprises an air bag control device configured to inflate the air bag(s) of the host vehicle when a "collision causing a collision impact that is stronger than a predetermined threshold" is detected. The air bag control device starts applying a mitigating-secondary-collision-damage-brake-force to the host vehicle when and after the air bag(s) is(are) inflated. In addition to the control to apply the mitigating-secondary-collision-damage-brake-force due to the inflation of the air bag(s), the present apparatus is configured perform/execute (carry out) the secondary collision damage mitigation control when a specific state is detected. The specific state is a state where the rapid acceleration pedal depression operation and the low impact collision are detected. This can expand states/scenes where the secondary collision damage mitigation control can be executed. Namely, the present apparatus can performs the secondary collision damage mitigation control when the low impact collision has occurred (i.e., even when the air bag(s) is (are) not inflated).

The driving assistance ECU 10 will be described in great detail later.

The vehicle states sensor 20 is configured to detect vehicle states (running states) of the host vehicle, and includes, for example, a vehicle speed sensor configured to detect/measure a vehicle speed of the host vehicle, an acceleration sensor configured to detect an acceleration of the host vehicle in a front-rear direction and an acceleration of the host vehicle in a lateral (left-right) direction, and a yaw rate sensor configured to detect a yaw rate of the host vehicle. Information (signals) detected/obtained by the vehicle states sensor 20 is transmitted to each of the ECUs through the CAN 70.

The operation states sensor 30 is configured to detect driving operation states of the host vehicle, the operation performed by the driver of the host vehicle. The operation states sensor 30 includes sensors and switches. More specifically, the operation states sensor 30 includes an acceleration operation amount sensor configured to detect an operation amount of an acceleration pedal (referred to as an "accelerator operation amount AC"), a brake operation amount sensor configured to detect an operation amount of a brake pedal, a brake switch configured to detect presence or absence of an operation to the brake pedal, a steering angle sensor configured to detect a steering angle, a steering torque sensor configured to detect a steering torque, a turn signal switch (blinker switch) configured to detect an operating state of turn signals, and a shift position sensor configured to detect a shift lever position for a transmission. Information (signals) detected/obtained by the vehicle states sensor 20 is transmitted to each of the ECUs through the CAN 70.

The brake ECU 40 is connected to a brake actuator 41. The brake actuator 41 is configured to vary/adjust oil pressure of brake fluid applied to a friction brake mechanism 42 of each of wheels so as to generate a frictional brake force corresponding to the oil pressure. The brake ECU 40 is configured to determine a driver request deceleration (or target driver requiring deceleration) based on the operation amount of the brake pedal detected by the brake operation amount sensor, and to control the brake actuator 41 in such a manner that the host vehicle decelerates at the driver request deceleration. Furthermore, when the brake ECU 40 has received a brake instruction transmitted from the driving assistance ECU 10, the brake ECU 40 controls the brake actuator 41 in such a manner that the host vehicle decelerates at a request deceleration (or a target requiring deceleration) that is contained in the brake instruction. The brake actuator 41 and the friction brake mechanism 42 forms a brake device to apply the brake force to the host vehicle.

The engine ECU 50 is connected to an engine actuator 51. The engine actuator 51 is an actuator for changing an operation state of an internal combustion engine 52, and includes, for example, a throttle valve actuator for changing an opening degree of the throttle valve. The engine ECU 50 is configured to determine a driver requiring torque based on the operation amount of the acceleration pedal detected by the acceleration operation amount sensor and the vehicle speed detected by the vehicle speed sensor, and to control the engine actuator 51 in such a manner that the engine 52 outputs a torque equal to the driver requiring torque. The engine actuator 51 and the engine 52 form a drive force generating device to generate drive force applied to the host vehicle. Furthermore, when the engine ECU 50 has received a driving force restriction instruction transmitted from the driving assistance ECU 10, the engine ECU 50 controls the engine actuator 51 so as to impose a limitation on the torque generated/output by the engine 52. It should be noted that the engine actuator 51 may be a driving device for an electric motor, when the host vehicle is an electric vehicle. That is, the driving device and the electric motor form the drive force generating device to generate the drive force applied to the host vehicle. When the host vehicle is a hybrid vehicle, the engine actuator 51 may include the engine actuator 51 described above and a driving device for an electric motor. That is, the engine actuator 51, the engine, the driving device, and the electric motor form the drive force generating device to generate the drive force applied to the host vehicle.

The notification ECU 60 is connected with a display (or a display device) 61, a speaker 62, and hazard lamps 63. The notification ECU 60 can display information regarding the driving assistance controls on the display 61 in response to instructions transmitted from the driving assistance ECU 10. The notification ECU 60 can make the speaker 62 generate alert sounds (e.g., a buzzer sound, and a voice message) in response to instructions transmitted from the driving assistance ECU 10. The notification ECU 60 can make the hazard lamps 63 blink in response to instructions transmitted from the driving assistance ECU 10.

The driving assistance ECU 10 will next be described in detail. The driving assistance ECU 10 comprises a rapid acceleration pedal depression operation determining section (sometimes referred to as an "RAPDO determining section", for convenience sake) 11, a low impact collision determination section 12, and a secondary collision damage mitigation control section (sometimes referred to as a "SCDM control section", for convenience sake) 13, in terms of its functions.

<Rapid Acceleration Pedal Depression Operation Determining Section (RAPDO Determining Section)>

The RAPDO determining section 11 is a functional part for determining whether or not the rapid acceleration pedal depression operation has been performed so as to determine (infer) whether or not the mistaken pedal operation of the driver has occurred. The RAPDO determining section 11 has stored a rapid acceleration pedal depression operation determining condition, and determines that the rapid acceleration pedal depression operation has been performed when (it is determined that) the rapid acceleration pedal depression operation determining condition becomes satisfied.

When it is determined that the rapid acceleration pedal depression operation has been performed (i.e., when the rapid acceleration pedal depression operation is detected), the RAPDO determining section 11 transmits a rapid acceleration pedal depression operation detection signal (sometimes referred to as an "RAPDO detection signal", for convenience sake) to the SCDM control section 13.

The rapid acceleration pedal depression operation determining condition is a condition to be satisfied when the following condition A2 is satisfied. The following condition A1 is a prerequisite condition for the condition A2.

Condition A1: The condition A1 is satisfied, when the accelerator operation amount AC is equal to or greater than a threshold ACth1 and an accelerator operation amount change rate ACV is equal to or greater than a threshold ACVth.

Condition A2: The condition A2 is satisfied, when the accelerator operation amount AC becomes equal to or greater than a threshold ACth2 that is larger than the threshold ACth1, within a period from a time point at which the condition A1 becomes satisfied to a time point at which a predetermined set time Tth elapses since the condition A1 becomes satisfied.

As described above, when the condition A2 becomes satisfied, the rapid acceleration pedal depression operation determining condition becomes satisfied so that it is determined that the rapid acceleration pedal depression operation has occurred. Namely, when the condition A2 becomes satisfied, it is determined that the driver has performed the mistaken pedal operation. When the rapid acceleration pedal depression operation determining condition becomes satisfied, the RAPDO determining section 11 sets a result (result indication flag) of the rapid acceleration pedal depression operation determination (referred to as an "RAPDO determination result", for convenience sake) to "RAPDO determination: ON".

The accelerator operation amount AC is the operation amount of an acceleration pedal detected by the acceleration operation amount sensor. The accelerator operation amount change rate ACV is a change amount in/of the accelerator operation amount AC per unit time. Namely, the accelerator operation amount change rate ACV is substantially a time derivative value of the accelerator operation amount AC.

It should be noted that the rapid acceleration pedal depression operation determining condition should not be limited to the above condition, and may be set as appropriate. For instance, the rapid acceleration pedal depression operation determining condition may include the above condition A1 only.

A rapid acceleration pedal depression operation end determining condition is a condition to become satisfied, when the accelerator operation amount AC decreases to a value equal to or lower a threshold ACth3. The threshold ACth3 is smaller than the threshold ACth1, and is set to a value for determining that the acceleration pedal is returned to a low degree (e.g., 10% of a full pedal operation).

When the rapid acceleration pedal depression operation end determining condition becomes satisfied, it is determined that the rapid acceleration pedal depression operation has ended. When the rapid acceleration pedal depression operation end determining condition becomes satisfied, the RAPDO determining section 11 sets the "RAPDO determination result" to "RAPDO determination: OFF".

While the rapid acceleration pedal depression operation has been performed (in other words, while the RAPDO determination result remains the "RAPDO determination: ON"), the RAPDO determining section 11 continues transmitting the RAPDO detection signal to the SCDM control section 13 and continues transmitting a rapid acceleration pedal depression operation notification instruction (referred to as an "RAPDO notification instruction", for convenience sake) to the notification ECU 60. While the notification ECU 60 is receiving the RAPDO notification instruction, the notification ECU 60 lets the speaker 62 generate an alert sound (e.g., a buzzer sound) and displays, on the display 61, an alert screen to urge the driver to release the acceleration pedal <Rapid Acceleration Pedal Depression Operation Determining Routine>

Figure 4:
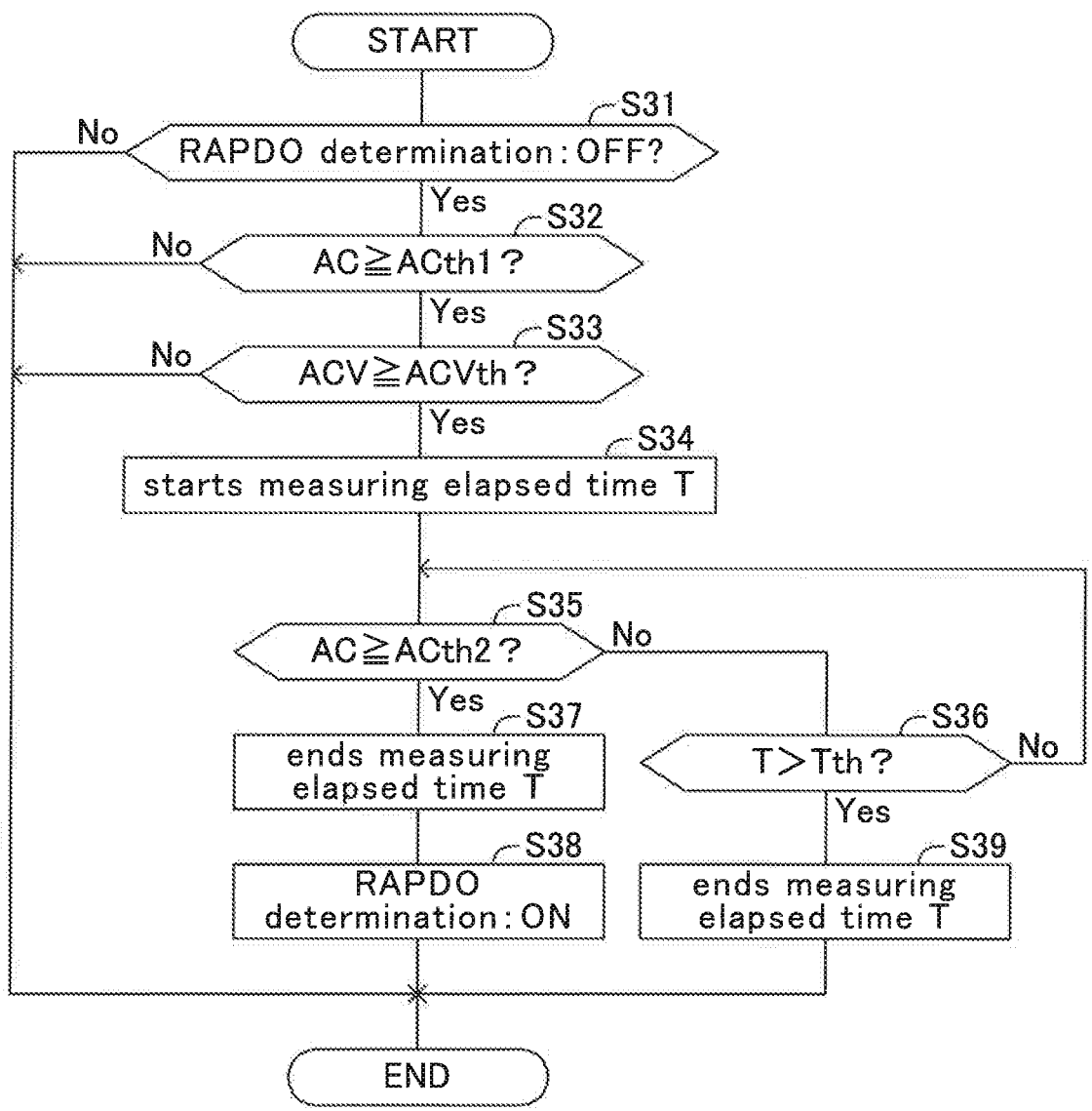
FIG. 4 is flowchart representing a rapid acceleration pedal depression operation determining routine.

FIG. 4 shows a rapid acceleration pedal depression operation determining routine executed by the RAPDO determining section 11 every time a predetermined time elapses.

After the RAPDO determining section 11 starts the rapid acceleration pedal depression operation determining routine, the RAPDO determining section 11 determines whether or not the RAPDO determination result is the "RAPDO determination: OFF" at step S31. When the result is the "RAPDO determination: OFF", the RAPDO determining section 11 proceeds to step S32. Whereas, when the result is the "RAPDO determination: ON", the RAPDO determining section 11 ends/finishes the present routine tentatively. It should be noted that an initial state of the RAPDO determination result is set to the "RAPDO determination: OFF".

At step S32, the RAPDO determining section 11 determines whether or not the accelerator operation amount AC is equal to or greater than the threshold ACth1. When the accelerator operation amount AC is smaller than the threshold ACth1, the RAPDO determining section 11 ends/finishes the present routine tentatively. When the accelerator operation amount AC becomes equal to or greater than the threshold ACth1 (S32: YES) while the RAPDO determining section 11 repeats the above processes, the RAPDO determining section 11 proceeds to step S33 so as to determine whether or not the accelerator operation amount change rate ACV is equal to or greater than the threshold ACVth. When the accelerator operation amount change rate ACV is smaller than the threshold ACVth, the RAPDO determining section 11 ends/finishes the present routine tentatively.

When the accelerator operation amount AC is equal to or greater than the threshold ACth1 (S32: YES) and the accelerator operation amount change rate ACV is equal to or greater than the threshold ACVth (S33: YES) while the RAPDO determining section 11 repeats the above processes, the RAPDO determining section 11 proceeds to step S34.

At step S34, the RAPDO determining section 11 starts measuring an elapsed time T using a timer. Subsequently, at step S35, the RAPDO determining section 11 determines whether or not the accelerator operation amount AC is equal to or greater than the threshold ACth2. When the accelerator operation amount AC is smaller than the threshold ACth2 (S35: No), the RAPDO determining section 11 proceeds to step S36 so as to determine whether or not the elapsed time T measured by the timer is longer than a predetermined set time Tth (e.g., 0.5 seconds). When the elapsed time T is equal to or shorter than the predetermined set time Tth, the RAPDO determining section 11 goes back to step S35 so as to execute the above processes.

When the accelerator operation amount AC becomes equal to or greater than the threshold ACth2 (S35: Yes) before the elapsed time T measured by the timer reaches the predetermined set time Tth while the above processes are being repeated, the RAPDO determining section 11 ends/finishes measuring the elapsed time T at step S37. Thereafter, at step S38, the RAPDO determining section 11 sets the RAPDO determination result (flag) to the "RAPDO determination: ON", and ends/finishes the present routine.

In contrast, the elapsed time T measured by the timer becomes longer than the predetermined set time Tth while the accelerator operation amount AC has not become equal to or greater than the threshold ACth2 (S36: Yes), the RAPDO determining section 11 finishes measuring the elapsed time T at step S39, and ends/finishes the present routine.

<Rapid Acceleration Pedal Depression Operation Determining Canceling Routine>

Figure 5:
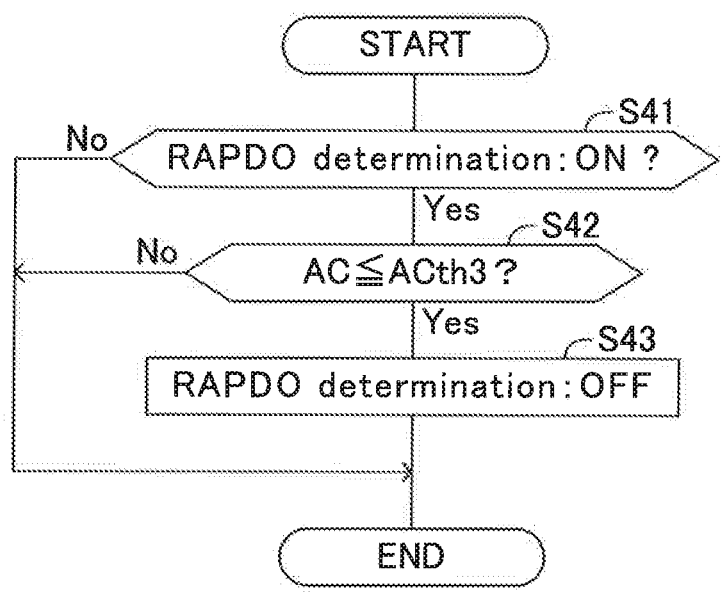
FIG. 5 is a rapid acceleration pedal depression operation determining canceling routine.

The RAPDO determining section 11 executes, every time a predetermined time elapses, a rapid acceleration pedal depression operation determining canceling routine shown in FIG. 5 so as to set the RAPDO determination result to the "RAPDO determination: OFF" from the "RAPDO determination: ON".

More specifically, after the RAPDO determining section 11 starts the rapid acceleration pedal depression operation determining canceling routine, the RAPDO determining section 11 determines whether or not the RAPDO determination result is the "RAPDO determination: ON" at step S41. When the result is the "RAPDO determination: OFF", the RAPDO determining section 11 ends/finishes the present routine tentatively. Whereas, when the result is the "RAPDO determination: ON", the RAPDO determining section 11 determines whether or not the accelerator operation amount AC is equal to or smaller than the threshold ACth3 (e.g., 10% of a full pedal operation) at step S42. When the accelerator operation amount AC is larger than the threshold ACth3, the RAPDO determining section 11 ends/finishes the present routine tentatively. Whereas, when the accelerator operation amount AC becomes equal to or smaller than the threshold ACth3 (S42: Yes) while the above processes are being repeated, the RAPDO determining section 11 proceeds to step S43 so as to set the RAPDO determination result to the "RAPDO determination: OFF" from the "RAPDO determination: ON". Thereafter, the RAPDO determining section 11 ends/finishes the present routine.

<Low Impact Collision Determination Section>

The low impact collision determination section 12 is a functional part for determining whether or not the low impact collision has occurred. The low impact collision determination section 12 has stored a predetermined low impact collision determination condition, and determines that the low impact collision has occurred when (it determines that) the low impact collision determination condition becomes satisfied. When the low impact collision determination section 12 determines that the low impact collision has occurred (i.e., when the low impact collision is detected), the low impact collision determination section 12 transmits a "low impact collision detection signal" (indicating that the low impact collision has occurred) to the SCDM control section 13.

The low impact collision determination section 12 determines that the low impact collision determination condition becomes satisfied when both of the following determination conditions B1 and B2 are satisfied.

Determination condition B1: This condition B1 is satisfied when an acceleration (a magnitude of an acceleration) of a vehicle body of the host vehicle is greater than an acceleration threshold.

Determination condition B2: This condition B2 is satisfied when an integrated value of the acceleration (the magnitude of the acceleration) of the vehicle body of the host vehicle is greater than an integrated value threshold.

The acceleration (the magnitude of the acceleration) of the vehicle body used in the above conditions is obtained using the acceleration sensor. The acceleration sensor is configured to generate (output) a signal indicative of the acceleration of the vehicle body in the front-rear direction (referred to as a "front-rear acceleration Gx"), and a signal indicative of the acceleration of the vehicle body in the left-right (lateral) direction (referred to as a "left-right acceleration Gy"). Each of the acceleration of the vehicle body and the integrated value of the acceleration of the vehicle body are used as collision indicative values indicative of a degree (impact) of (caused by) a collision of the host vehicle.

It should be noted that the acceleration detected by the acceleration sensor includes a deceleration (i.e., a negative acceleration). The low impact collision determination section 12 performs the calculations with discriminating between a case where the acceleration (Gx, or Gy) detected by the acceleration sensor is positive and a case where the acceleration (Gx, or Gy) detected by the acceleration sensor is negative. Furthermore, the left-right acceleration Gy is defined so as to be positive when a direction of the left-right acceleration Gy is one (e.g., the left direction) of the left directions and the right direction, and so as to be negative when the direction of the left-right acceleration Gy is the other (e.g., the right direction) of the left directions and the right direction. In the present specification, when discussing a magnitude of the left-right acceleration Gy that is negative for a comparison with a threshold, an absolute value of the left-right acceleration Gy is used.

In the present example, the low impact collision determination section 12 is configured to determine whether or not the low impact collision has occurred at a front part of the host vehicle, and is configured to also determine whether or not a low impact collision has occurred at a side part of the host vehicle. Hereinafter, the low impact collision that occurs at the front part of the host vehicle is sometimes referred to as a "front collision", and the low impact collision that occurs at the side part of the host vehicle is sometimes referred to as a "side collision". The low impact collision determination section 12 determines that the low impact collision determination condition becomes satisfied, when at least one of a collision determination condition for the front collision and a collision determination condition for the side collision becomes satisfied.

The collision determination condition for the front collision becomes satisfied when both of a determination condition B1a (as the condition B1) described below and a determination condition B2a (as the condition B2) described below are satisfied.

The determination condition B1a is satisfied when the magnitude/absolute value of the front-rear acceleration Gx (that is negative in this case) of the vehicle body is greater than an acceleration threshold Gxth for the front collision determination.

The determination condition B2a is satisfied when the integrated value Vx of the front-rear acceleration Gx of the vehicle body is greater than an integrated value threshold Vxth for the front collision determination.

The collision determination condition for the side collision becomes satisfied, when both of a determination condition B1b (as the condition B1) described below and a determination condition B2b (as the condition B2) described below are satisfied.

The determination condition B1b is satisfied when (a magnitude of) the left direction acceleration Gyl (that is the left-right acceleration Gy toward left) of the vehicle body is greater than an acceleration threshold Gylth for the left side collision determination.

The determination condition B2b is satisfied when the integrated value Vyl of the (magnitude of the) left direction acceleration Gyl of the vehicle body is greater than an integrated value threshold Vylth for the left side collision determination.

The collision determination condition for the side collision also becomes satisfied, when both of a determination condition B1c (as the condition B1) described below and a determination condition B2c (as the condition B2) described below are satisfied.

The determination condition B1c is satisfied when (a magnitude of) the right direction acceleration Gyr (that is the left-right acceleration Gy toward right) of the vehicle body is greater than an acceleration threshold Gyrth for the right side collision determination.

The determination condition B2c is satisfied when the integrated value Vyr of (magnitude of the) right direction acceleration Gyr of the vehicle body is greater than an integrated value threshold Vyrth for the right side collision determination.

The above integrated value of the acceleration (i.e., any one of the integrated value Vx, the integrated value Vyl, and the integrated value Vyr) is an integrated value of one of the respective accelerations (or decelerations) for a period from a start time point (start timing of the integration) described below to an end time point (end timing of the integration) described below.

The start time point (start timing of the integration) is a first start timing described below or a second start timing described below, whichever comes first.

The first start timing is a timing at which an interval integrated value of the front-rear acceleration Ox (that is an integrated value of the (magnitude of the) front-rear acceleration Gx for a predetermined set time window) exceeds a front-rear interval integrated value threshold.

The second start timing is a timing at which an interval integrated value of the left-right acceleration Gy (that is an integrated value of the (magnitude of the) left-right acceleration Gy for a predetermined set time window) exceeds a left-right interval integrated value threshold.

The end time point (end timing of the integration) is a first end timing described below or a second end timing described below, whichever comes first.

The first end timing is a timing at which a first predetermined set time elapses after a "resultant interval integrated value of the interval integrated value of the front-rear acceleration Gx and the interval integrated value of the left-right acceleration Gy" becomes lower than a resultant interval integrated value threshold.

The second end timing is a timing at which a second predetermined set time (that is longer than the first predetermined set time) elapses after the start time point (start timing of the integration).

The low impact collision determination section 12 repeatedly calculates the above interval integrated values every time a predetermined interval elapses, so as to detect the start time point (start timing of the integration) and the end time point (end timing of the integration).

The acceleration thresholds (i.e., the acceleration threshold Gxth, the acceleration threshold Gylth, and the acceleration threshold Gyrth) and the integrated value thresholds (i.e., the integrated value threshold Vxth, the integrated value threshold Vylth, and the integrated value threshold Vyrth) are set such that the collision determination condition for the front collision or the collision determination condition for the side collision becomes satisfied earlier than a timing at which the air bag control apparatus starts to inflate the air bag(s). In other words, the low impact collision is detected for a collision that does not cause the air bag(s) to be inflated.

For example, when the host vehicle is running on a rough road, the magnitude of one of the accelerations of Gx, Gyl, and Gyr may temporarily and/or momentarily exceed the respective thresholds (Gxth, Gylth, Gyrth). Thus, if it is determined that the low impact collision has occurred when only one of the conditions of the determination conditions B1a, B1b, and B1c is satisfied, such a determination may be incorrect. This is because, it is difficult to discriminate between the case where the low impact collision has occurred and the case where the host vehicle is running on the rough road, using only one of the conditions of the determination conditions B1a, B1b, and B1c.

Whereas, one of the integrated values of Vx, Vyl, and Vyr of when the low impact collision has occurred becomes larger than the respective integrated values of when the host vehicle is running on the rough road. In view of this, in the present embodiment, the determination conditions B2a, B2b, and B2c are further employed to determine the occurrence of or to detect the low impact collision. Accordingly, a possibility that it is mistakenly determined that the low impact collision has occurred can be reduced while the host vehicle is running on the rough road.

It should be noted that, although the low impact collision to be determined to have occurred includes the front collision and the side collision in the present embodiment, however, it may include a low impact collision that occurs at a rear part of the host vehicle. The low impact collision that occurs at the rear part of the host vehicle is sometimes referred to as a "rear collision".

A collision determination condition for the rear collision becomes satisfied, when both of a determination condition B1d (as the condition B1) described below and a determination condition B2d (as the condition B2) described below are satisfied.

The determination condition B1d is satisfied when the magnitude/absolute value of the front-rear acceleration Gx (that is positive in this case) of the vehicle body is greater than an acceleration threshold Gxth for the rear collision determination.

The determination condition B2d is satisfied when the integrated value Vx of the front-rear acceleration Gx (that is positive in this case) of the vehicle body is greater than an integrated value threshold Vxth for the rear collision determination.

In this configuration, the low impact collision determination section 12 determines that the low impact collision determination condition becomes satisfied, when one of the collision determination condition for the front collision, the collision determination condition for the side collision (the left side collision or the right side collision), and the collision determination condition for the rear collision.

<Secondary Collision Damage Mitigation (SCDM) Control Section>

The secondary collision damage mitigation control section (SCDM control section) 13 is a functional part for performing (carrying out) the secondary collision damage mitigation control for applying the brake force to the host vehicle and suppressing (decreasing) the drive force of the host vehicle so as to mitigate the secondary collision damage of the host vehicle. The secondary collision damage mitigation control section 13 is sometimes referred to as the "SC damage mitigation control section 13" or the "SCDM control section 13". "SC" is an abbreviation of "secondary or second collision".

The SCDM control section 13 is configured to (or has a function to) determine, based on the rapid acceleration pedal depression operation detection signal (RAPDO detection signal) supplied from the rapid acceleration pedal depression operation determining section (RAPDO determining section) 11 and based on the low impact collision detection signal supplied from the low impact collision determination section 12, whether to perform the secondary collision damage mitigation control, that is, hereinafter, referred to as the "SC damage mitigation control".

Figure 2:
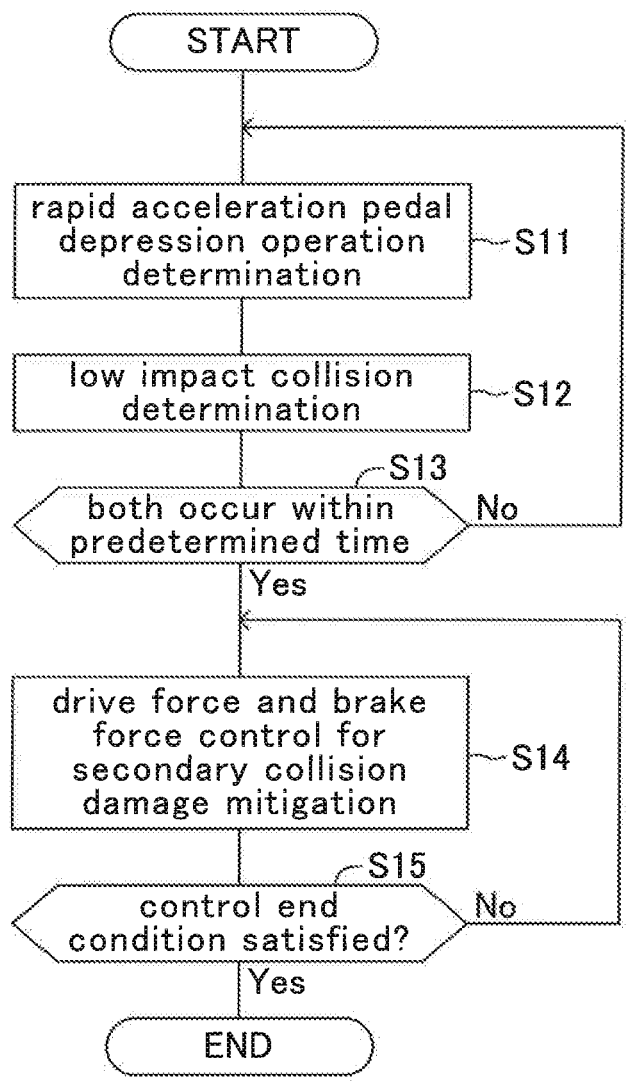
FIG. 2 is flowchart representing a secondary collision damage mitigation control routine.

FIG. 2 shows an SC damage mitigation control routine executed by the SCDM control section 13. The SCDM control section 13 starts executing the SC damage mitigation control routine when an initialization process is finished after an ignition switch is turned on.

After the SCDM control section 13 starts executing the SC damage mitigation control routine, it firstly determines whether or not the rapid acceleration pedal depression operation has been performed at step S11. More specifically, the SCDM control section 13 determines whether or not the RAPDO detection signal (rapid acceleration pedal depression operation detection signal) has been being supplied from the RAPDO determining section 11 (rapid acceleration pedal depression operation determining section 11). As described above, the RAPDO detection signal is being supplied/transmitted from the RAPDO determining section 11 to the SCDM control section 13 in a period from a time point at which the rapid acceleration pedal depression operation determining condition has become satisfied to a time point at which the rapid acceleration pedal depression operation end determining condition becomes satisfied (in other words, while the RAPDO determination result remains the "RAPDO determination: ON"). The SCDM control section 13 memorizes/stores/holds a fact that the RAPDO detection signal has been supplied in a period from the time point at which the RAPDO detection signal started to be supplied to a time point at which a predetermined set time T2 elapses after the RAPDO detection signal is no longer supplied.

Subsequently, at step S12, the SCDM control section 13 determines whether or not the low impact collision has occurred. More specifically, the SCDM control section 13 determines whether or not the low impact collision detection signal has been supplied from the low impact collision determination section 12. The low impact collision detection signal is supplied from the low impact collision determination section 12 to the SCDM control section 13, when the low impact collision determination condition (one of a combination of B1a and B2a, B1b and B2b, B1c and B2c, and B1d and B2d) becomes satisfied (or is determined to become satisfied). The SCDM control section 13 memorizes/stores/holds, for a predetermined set time T1, a determination result regarding whether or not the low impact collision has occurred.

Subsequently, at step S13, the SCDM control section 13 determines whether or not both of the rapid acceleration pedal depression operation and the low impact collision have occurred within a predetermined time period. In other words, the SCDM control section 13 determines whether or not a time difference between the time of the occurrence of the rapid acceleration pedal depression operation and the time of the occurrence of the low impact collision is equal to or shorter than the length of the predetermined time period. The timing of the occurrence of the rapid acceleration pedal depression operation and the timing of the occurrence of the low impact collision do not necessarily coincide with each other. For example, the low impact collision may occur due to the occurrence of the rapid acceleration pedal depression operation by the driver. Alternatively, the driver may perform the rapid acceleration pedal depression operation (the mistaken pedal operation) when he/she is startled at the low impact collision.

Figure 3:
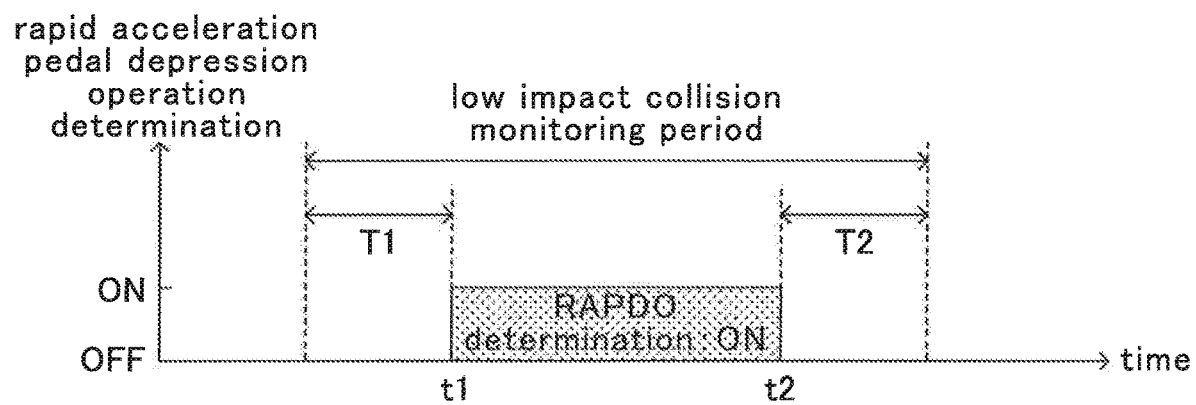
FIG. 3 shows a low impact collision monitoring period (or a low impact collision determination applying period).

In view of the above, as shown in FIG. 3, a low impact collision monitoring period is provided.

A start time point of the low impact collision monitoring period is a time point the predetermined set time T1 before a time point t1 at which the rapid acceleration pedal depression operation is determined to start to be performed/occurred. The time point t1 is the time point at which the result of the rapid acceleration pedal depression operation determination (RAPDO determination result) is changed from the "RAPDO determination: OFF" to the "RAPDO determination: ON".

An end time point of the low impact collision monitoring period is a time point the predetermined set time T2 after a time point t2 at which the rapid acceleration pedal depression operation is determined to be finished. The time point t2 is the time point at which the result of the rapid acceleration pedal depression operation determination (RAPDO determination result) is changed from the "RAPDO determination: ON" to the "RAPDO determination: OFF".

At step S13 described above, the SCDM control section 13 determines that the both of the rapid acceleration pedal depression operation and the low impact collision have occurred within the predetermined time period/window, if the both of the rapid acceleration pedal depression operation and the low impact collision have occurred within the low impact collision monitoring period.

Accordingly, it is determined that both of the rapid acceleration pedal depression operation and the low impact collision have occurred within the predetermined time period in the following cases, for instance.

(a) A case where it is determined that that the rapid acceleration pedal depression operation has occurred within the predetermined set time T1 from/after the time point at which it was determined that the low impact collision occurred.

(b) A case where it is determined that the low impact collision has occurred while it has been being determined that the rapid acceleration pedal depression operation is occurring (being performed).

(c) A case where it is determined that the low impact collision has occurred within the predetermined set time T2 from the time point at which it was determined that the rapid acceleration pedal depression operation ended/finished.

When the SCDM control section 13 makes a "No" determination at step S13 (namely, when it is not determined that both of the rapid acceleration pedal depression operation and the low impact collision have occurred within the predetermined time period), the SCDM control section 13 goes back to step S11 so as to execute the processes (S11-S13) described above. For example, the processes (S11-S13) described above are repeatedly executed in one of the following cases.

(d) A case where it is determined that neither the rapid acceleration pedal depression operation nor the low impact collision has occurred.

(e) A case where it is determined that only the rapid acceleration pedal depression operation is occurring (being performed).

(f) A case where it is determined that only the low impact collision has occurred.

When the SCDM control section 13 determines that both of the rapid acceleration pedal depression operation and the low impact collision have occurred within the predetermined time period while the processes (S11-S13) described above are repeatedly executed (S13: Yes), the SCDM control section 13 proceeds to step S14 so as to execute (carry out) the SC damage mitigation control. More specifically, the SCDM control section 13 transmits, to the brake ECU 40, the SC damage mitigation control instruction that contains information of a request deceleration (or a target requiring deceleration) for the SC damage mitigation control. When the brake ECU 40 receives the SC damage mitigation control instruction, the brake ECU 40 controls the brake actuator 41 in such a manner that the host vehicle decelerates at the request deceleration for the SC damage mitigation control. Accordingly, the host vehicle is forced to decelerate due/owing to the frictional brake force generated at the wheels, without requiring the brake pedal operation by the driver.

While the SCDM control section 13 is executing the SC damage mitigation control, the SCDM control section 13 transmits, to the engine ECU 50, the driving force restriction instruction to impose a limitation on the torque generated/output by the engine 52 such as for making the torque generated by the engine 52 zero or a torque for letting the host vehicle creep. In this manner, the engine ECU 50 controls the engine actuator 51 so as to impose the limitation on the torque generated by the engine 52. Accordingly, even if the driver operates the acceleration pedal, the driver requiring torque is ignored. Thus, the host vehicle does not accelerate in accordance with the operation to the acceleration pedal by the driver.

In addition, while the SCDM control section 13 is executing the SC damage mitigation control, the SCDM control section 13 transmits, to the notification ECU 60, an instruction to let the hazard lamps 63 blink. Therefore, while the SC damage mitigation control is being executed, the hazard lamps 63 blink.

Subsequently, at step S15, the SCDM control section 13 determines whether or not an end condition of the SC damage mitigation control becomes satisfied. The SCDM control section 13 determines that the end condition of the SC damage mitigation control becomes satisfied, when at least one of the following determination conditions C1 and C2 becomes satisfied.

The determination condition C1 is satisfied when releasing the acceleration pedal is detected.

The determination condition C2 is satisfied when the stop of the host vehicle is detected (i.e., the host vehicle has stopped).

For instance, the determination condition C1 becomes satisfied when it is determined that the accelerator operation amount AC detected by the acceleration operation amount sensor becomes equal to or smaller than a threshold ACth3. For instance, the determination condition C2 becomes satisfied when it is determined that the vehicle speed detected by the vehicle speed sensor is equal to zero or equal to or smaller than a vehicle speed threshold that is about zero.

It should be noted that the end condition of the SC damage mitigation control is not limited to the above described condition. For example, the end condition of the SC damage mitigation control may include the condition C1 only.

Unless the end condition of the SC damage mitigation control becomes satisfied (S15: No), the SCDM control section 13 goes back to step S14, so that the SC damage mitigation control continues being performed.

When the end condition of the SC damage mitigation control becomes satisfied (S15: Yes), the SCDM control section 13 ends/finishes the SC damage mitigation control routine.

When the rapid acceleration pedal depression operation is detected, that pedal depression operation is likely to be the mistaken pedal operation. Such a mistaken pedal operation may cause the host vehicle to collide with an obstacle (e.g., a guard rail) with higher possibility than a normal driving case. In addition, in such a case, the driver mistakenly depresses the acceleration pedal instead of the brake pedal, he/she may continue depressing the acceleration pedal even after the host vehicle collides with the obstacle.

Accordingly, when the mistaken pedal operation has been occurring, it can be inferred that it is relatively difficult for the driver to perform an appropriate operation to avoid the secondary collision damage and/or to mitigate the secondary collision damage. Therefore, it is preferable that the SC damage mitigation control be performed for not only a collision that causes the air bag(s) to be inflated but also for the low impact collision that does not cause the air bag(s) to be inflated in such a case.

In view of the above, the present embodiment performs the SC damage mitigation control when the rapid acceleration pedal depression operation is detected and the low impact collision is detected.

Accordingly, when the low impact collision has occurred, the SC damage mitigation control can be executed as appropriate, and therefore, the secondary collision damage can be mitigated/avoided.

Furthermore, it may sometimes be determined (not so often) that the low impact collision determination condition becomes satisfied due to a travel on a rough road or due to a run on a curbstone, so that it may be mistakenly determined that the low impact collision has occurred. However, even if it is mistakenly determined that the low impact collision has occurred in such a case, the SC damage mitigation control is not carried out unless the rapid acceleration pedal depression operation is detected. Therefore, even in this case, a rapid acceleration due to the mistaken pedal operation can be prevented.

Moreover, whether or not the mistaken pedal operation has been occurring is determined based on the presence or the absence of the rapid acceleration pedal depression operation. Thus, there is a possibility that it is mistakenly determined that the mistaken pedal operation has been occurring. Even if the rapid acceleration pedal depression operation is not the mistaken pedal operation, the SC damage mitigation control is executed on the condition that it is determined that the low impact collision has occurred. Thus, the SC damage mitigation control is appropriately executed.

Consequently, the present embodiment can broaden "the cases (chances) where the SC damage mitigation control is carried out" to "the cases where the low impact collision has occurred". In other words, the present embodiment can carry out the SC damage mitigation control appropriately at an early timing that is before the air bag(s) starts to be inflated.

First Modified Embodiment

In the present embodiment, the SC damage mitigation control performed at step S14 is the control to generate the brake force and to impose the limit on the drive force (e.g., the drive force is set to zero), so as to decelerate the host vehicle at the request deceleration. However, the SC damage mitigation control may be a control only to impose the limit on the drive force without generating the brake force, so as to mitigate the secondary collision damage. For example, at step S14, the SCDM control section 13 transmits the SC damage mitigation control instruction to the engine ECU 50, but does not transmit the SC damage mitigation control instruction to the brake ECU 40. While the engine ECU 50 is receiving the SC damage mitigation control instruction, the engine ECU 50 sets the target torque to a torque obtained by imposing a predetermined SC damage mitigation upper limit torque on the driver requiring torque, and controls the engine actuator 51 in such a manner that the torque generated by the engine 52 coincides with the target torque. Note that, in this case, the predetermined SC damage mitigation upper limit torque may be zero.

Second Modified Embodiment

For example, when the brake force is generated by the SC damage mitigation control in a case where an inter-vehicle distance between the host vehicle and a following vehicle that follows the host vehicle is short, the following vehicle may excessively approach the host vehicle.

In view of this, the second modified embodiment carries out the SC damage mitigation control so as to:
  generate the brake force applied to the host vehicle (with or without suppressing the drive force applied to the host vehicle) when the following vehicle is not detected in a proximity area that is an area near the host vehicle; and
  suppress the drive force applied to the host vehicle without generating the brake force applied to the host vehicle when the following vehicle is detected in the proximity area.

This driving assistance apparatus according to the second modified embodiment further comprises a rear direction monitoring sensor 100, as shown by a broken line in FIG. 1. The rear direction monitoring sensor 100 is a sensor to detect an object that is present in the rear area of the host vehicle, and may be a camera sensor and/or a radar sensor. Specifically, the driving assistance apparatus according to the second modified embodiment comprises both of the camera sensor and the radar sensor, as the rear direction monitoring sensor 100. The driving assistance apparatus synthesizes information supplied by the both sensors so as to recognize/detect the object (hereinafter, referred to as a target object) that is present in the rear area of the host vehicle. The rear direction monitoring sensor 100 obtains information on a type of the target object, a size of the target object, a distance between the target object and the host vehicle, a relative speed between the target object and the host vehicle, a direction of the target object with respect to the host vehicle, or the like, and transmits the information to the CAN 70 so that the driving assist ECU 10 of the second modified embodiment can obtain information on the target object (i.e., the following vehicle).

Figure 6:
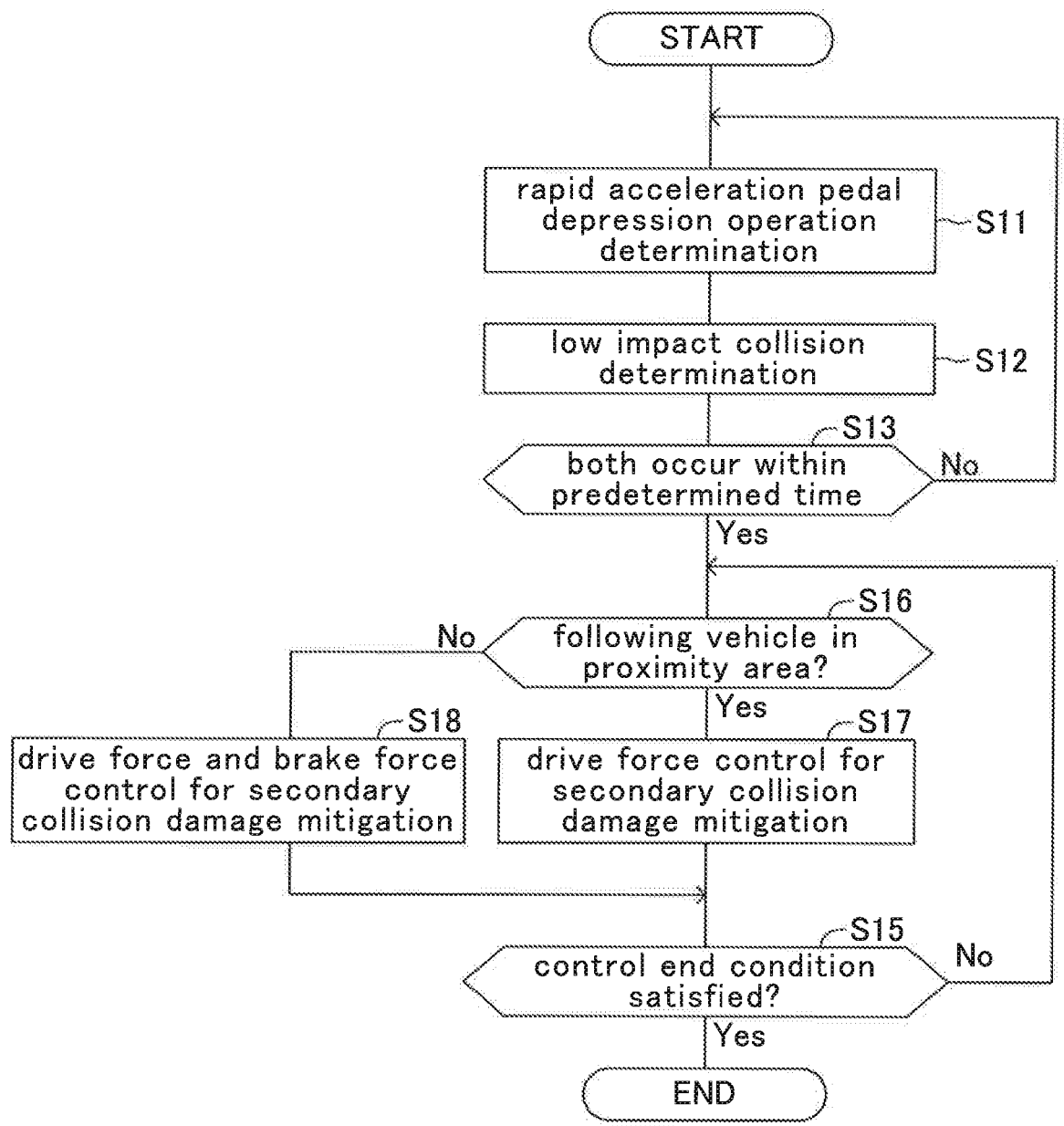
FIG. 6 is flowchart representing a secondary collision damage mitigation control routine of a modified example 2.

FIG. 6 shows an SC damage mitigation control routine for the second modified embodiment. This routine shown in FIG. 6 is different from the routine shown in FIG. 2 that the above embodiment executes only in that steps S16 to S18 are incorporated in place of step S14 of FIG. 2. The other processes (S11 to S13, S15) are the same as those shown in FIG. 2. Hereinafter, the differences between FIG. 2 and FIG. 6 will be mainly described.

The SCDM control section 13 of the second modified embodiment proceeds to step S16 when it determines at step S13 that both of the rapid acceleration pedal depression operation and the low impact collision have occurred within the predetermined time period (S13: Yes). At step S16, the SCDM control section 13 determines whether or not the following vehicle is present in the proximity area of the rear area of the host vehicle, based on the information supplied from the rear direction monitoring sensor 100. The proximity area is, for example, an area within a set distance from the host vehicle in the rear direction. If the inter-vehicle distance between the following vehicle and the host vehicle is longer than the set distance, the following vehicle does not excessively come close to the host vehicle even when the SC damage mitigation control generates the brake force applied to the host vehicle. For example, the set distance may preferably be set to a distance which is longer as the vehicle speed detected by the vehicle speed sensor is higher.

When the SCDM control section 13 determines that the following vehicle is present in the proximity area of the rear area of the host vehicle (S16: Yes), the SCDM control section 13 performs the SC damage mitigation control so as to suppress the drive force applied to the host vehicle without generating the brake force applied to the host vehicle at step S17. In this case, the SCDM control section 13 transmits the SC damage mitigation control instruction for suppressing (imposing a limitation on) the torque generated by the engine 52 to the engine ECU 50, but does not transmit the SC damage mitigation control instruction to the brake ECU 40.

In contrast, when the SCDM control section 13 determines that the following vehicle is not present in the proximity area of the rear area of the host vehicle (S16: No), the SCDM control section 13 proceeds to step S18. At step S18, the SCDM control section 13 performs the SC damage mitigation control so as to transmit the SC damage mitigation control instruction for generating the brake force to the brake ECU 40 and transmit the SC damage mitigation control instruction for suppressing (imposing a limitation on) the torque generated by the engine 52 to the engine ECU 50. The process of step S18 is the same as that of step S14 that the above described embodiment executes.

The SCDM control section 13 proceeds to step S15, after it execute the process of step S17 or of step S18. At step S15, the SCDM control section 13 determines whether or not the SC damage mitigation control end condition becomes satisfied. The SCDM control section 13 executes the SC damage mitigation control in the above manner until it determines that the SC damage mitigation control end condition becomes satisfied.

The thus configured second modified embodiment can prevent the following vehicle from approaching the host vehicle too closely even when the SC damage mitigation control is performed.

Third Modified Embodiment

The rapid acceleration pedal depression operation may sometimes be the mistaken pedal operation by an aged driver. Such a driver sometimes panics and continues depressing the acceleration pedal if he/she has performed the mistaken pedal operation. If the acceleration pedal continues to be depressed when and after the SC damage mitigation control is finished, the host vehicle may rapidly start to accelerate. In view of this, the third modified embodiment is configured to maintain the host vehicle at a stopped state forcibly after the SC damage mitigation control is finished. The third modified embodiment is further configured to cancel the forcible stopped state of the host vehicle based on an canceling instruction sent from a communication (call) center after it is confirmed that the driver is in the state of being in control, using (through) a conversation between the driver and an operator of the communication (call) center.

The driving assistance apparatus according to the third modified embodiment comprises a DCM (Data Communication Module) 110 and a verification ECU 120, as shown by alternate long and short dash lines in FIG. 1, in addition to the configurations of the present embodiment described above. The DCM 110 is a communication device configured to communicate with a center device 200 provided at the center.

The verification ECU 120 is an electronic control unit configured to perform a lock and unlock control for doors of the host vehicle based on signals transmitted from an electronic key owned by the user (driver). The verification ECU 120 determines whether or not a key ID contained in a lock instruction signal transmitted from the electronic key or contained in an unlock instruction signal transmitted from the electronic key matches with (coincides with) a key ID stored/memorized in the verification ECU 120 for verification. When the key IDs are matched with each other, the verification ECU 120 sends a lock instruction or an unlock instruction to an unillustrated body ECU. The body ECU controls an unillustrated door lock motors, based on the lock instruction or the unlock instruction sent from the verification ECU 120, so as to lock or unlock the respective doors.

The electronic key for an aged user and the electronic key for a user other than the aged user have been prepared. The aged user owns the electronic key for the aged user, and the user other than the aged user owns the electronic key for the user other than the aged user. The signals transmitted from the electronic key contains identification signals indicative of whether the owner of the electronic key is the aged user or the user other than the aged user. Therefore, the verification ECU 120 can determine (discriminate), using the identification signals, whether the lock instruction signal or the unlock instruction signal, that the verification ECU 120 has last received, is from the electronic key for the aged user or the electronic key for the user other than the aged user. Thus, the verification ECU 120 can determine/infer whether or not the current driver of the host vehicle is the aged person. The verification ECU 120 determines whether or not the current driver of the host vehicle is the aged person, and send the determination result indicative of whether or not the current driver of the host vehicle is the aged person to the driving assistance ECU 10 (SCDM control section 13).

Figure 7:
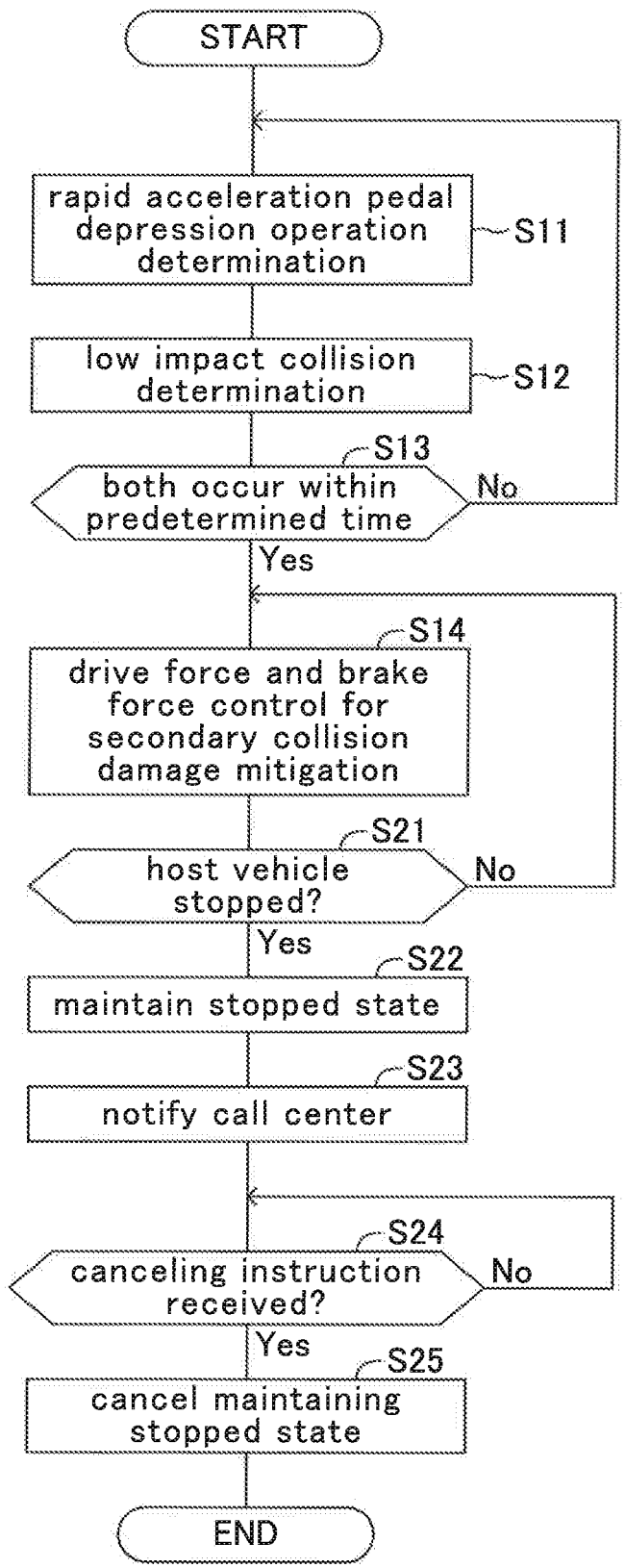
FIG. 7 is flowchart representing a secondary collision damage mitigation control routine of a modified example 3.

The SCDM control section 13 of the third modified embodiment executes an SC damage mitigation control routine shown in FIG. 7 (in place of the routine shown in FIG. 2) when it is determined that the current driver of the host vehicle is the aged person based on the determination result sent from the verification ECU 120. This SC damage mitigation control routine shown in FIG. 7 is different from the routine shown in FIG. 2 that the above embodiment executes only in that steps S11 to S25 are incorporated in place of step S15 of FIG. 2. The other processes (S11 to S14) are the same as those shown in FIG. 2. Hereinafter, the differences between FIG. 2 and FIG. 7 will be mainly described.

After the SCDM control section 13 starts the SC damage mitigation control (step S14), the SCDM control section 13 determines whether or not the host vehicle has stopped at step S21. When the host vehicle has not stopped, the SCDM control section 13 goes back to step S14.

When the host vehicle has stopped owing to the SC damage mitigation control (S21: Yes), the SCDM control section 13 proceeds to step S22 so as to maintain the host vehicle at the stopped state. More specifically, the SCDM control section 13 transmits an instruction for stopping and holding to the brake ECU 40. The brake ECU 40 controls the brake actuator 41 so as to apply a predetermined oil pressure for stopping and holding to the friction brake mechanism 42 so as to generate the frictional brake force, while the brake ECU 40 is receiving the instruction for stopping and holding. Accordingly, the host vehicle is forcibly maintained at the stopped state so as not to move forward and/or backward due to the brake force. It should be noted that the SCDM control section 13 transmits, to the notification ECU 60, the instruction to let the hazard lamps 63 blink, while the SCDM control section 13 maintains the host vehicle at the stopped state.

At step S23, the SCDM control section 13 notifies the center device 200 of a state of the host vehicle through the DCM 110. For example, at step S23, the SCDM control section 13 transmits information indicating that the host vehicle is maintained at the stopped state after the SC damage mitigation control is finished to the center device 200 through the DCM 110. When the information is received by the center device 200, an operator at the communication (call) center starts talking (conversation) with the driver of the host vehicle through the DCM 110 to determine whether the driver is in the state of being in control. When the operator determines that the driver of the host vehicle is in the state of being in control, the operator lets the center device 200 transmit the canceling instruction to the DCM 110.

At step S24, the SCDM control section 13 waits for the canceling instruction from the center device 200. When the SCDM control section 13 detects a reception of the canceling instruction transmitted from the center device 200 (S24: Yes), the SCDM control section 13 proceeds to step S25 so as to stop transmitting the instruction for stopping and holding to the brake ECU 40. Consequently, the oil pressure for stopping and holding is no longer supplied to the friction brake mechanism 42, so that the host vehicle is no longer forcibly maintained at the stopped state (i.e., the stopped state is canceled). Thus, the host vehicle can start moving, thereafter.

According to the above third modified embodiment, the host vehicle is maintained at the stopped state tentatively when the SC damage mitigation control is performed after the mistaken pedal operation has performed. Thereafter, the stopped state is canceled if it is confirmed that the driver of the host vehicle is in the state of being in control. This allows the host vehicle to start moving more safely. In addition, since this control is executed only when the driver is the aged person who may sometimes tend to perform the mistaken pedal operation, the forcible stopped state may not be unnecessarily maintained.

The driving assistance apparatuses according to the present embodiment and the modified embodiments have been described. It should be noted that the present disclosure should not be limited to the above apparatuses, and may be modified unless the modifications depart from the scope of the present disclosure.

For example, the SC damage mitigation control routine regarding the third modified embodiment is executed when the driver is the aged person, however, the routine may be executed regardless of whether or not the driver is the aged person.

For example, a selection switch configured to be operated by the user may be provided. The user may operate the selection switch to allow the SC damage mitigation control routine to be executed or to prohibit the SC damage mitigation control routine from being executed.

For example, in the above embodiments, the low impact collision determination condition is determined to become satisfied when both of the determination conditions B1 and B2 are satisfied. However, the low impact collision determination condition may be determined to become satisfied when only either one of the determination conditions B1 and B2 is satisfied.

What is claimed is:

1. A driving assistance apparatus comprising:
   an acceleration operation amount sensor configured to detect an operation amount of an acceleration pedal;
   an acceleration sensor configured to detect an acceleration of a host vehicle; and
   a control unit configured to:
   obtain an acceleration pedal operation indicative value based on said operation amount of said acceleration pedal;
   determine that a rapid acceleration pedal depression operation has been performed when said acceleration pedal operation indicative value satisfies a rapid acceleration pedal depression operation condition for determining an occurrence of said rapid acceleration pedal depression operation;
   obtain, based on said acceleration, a collision indicative value indicative of an impact caused by a collision of said host vehicle with an object;
   determine that a low impact collision has occurred when said collision indicative value satisfies a low impact collision determining condition that is satisfied when said collision indicative value becomes larger than a low impact collision threshold, wherein an air bag of said host vehicle is not caused to be inflated when said collision indicative value becomes larger than said low impact collision threshold;
   determine whether or not a time difference between a time point at which said rapid acceleration pedal depression operation is determined to have been performed and a time point at which said low impact collision is determined to have occurred is equal to or shorter than a length of a predetermined time period; and
   execute a secondary collision damage mitigation control when said time difference is determined to be equal to or shorter than said length of said predetermined time period,
   wherein said secondary collision damage mitigation control includes at least one of a control to apply brake force to said host vehicle and a control to suppress drive force applied to said host vehicle.

2. The driving assistance apparatus according to claim 1, further comprising:
   a rear direction monitoring sensor configured to obtain information on a following vehicle that is running behind said host vehicle,
   and wherein,
   said control unit is configured to, when executing said secondary collision damage mitigation control,
   apply said brake force to said host vehicle if it is determined, based on said information obtained by said rear direction monitoring sensor, that said following vehicle is not present in a proximity area that is a predetermined rear area of said host vehicle; and
   suppress said drive force applied to said host vehicle without applying said brake force to said host vehicle, if it is determined, based on said information obtained by said rear direction monitoring sensor, that said following vehicle is present in said proximity area.

3. The driving assistance apparatus according to claim 2, further comprising a communication module configured to communicate with a center outside of said host vehicle:
   wherein, said control unit is configured to:
   maintain said host vehicle at a stopped state after said host vehicle is stopped due to said secondary collision damage mitigation control;
   notify said center of a state of said host vehicle through said communication module after said host vehicle is stopped due to said secondary collision damage mitigation control; and
   cancel maintaining said host vehicle at said stopped state upon a reception of a canceling instruction transmitted from said center.

4. The driving assistance apparatus according to claim 1, further comprising a communication module configured to communicate with a center outside of said host vehicle:
   wherein, said control unit is configured to:
   maintain said host vehicle at a stopped state after said host vehicle is stopped due to said secondary collision damage mitigation control;
   notify said center of a state of said host vehicle through said communication module after said host vehicle is stopped due to said secondary collision damage mitigation control; and cancel maintaining said host vehicle at said stopped state upon a reception of a canceling instruction transmitted from said center.

5. The driving assistance apparatus according to claim 1, further comprising an air bag control device configured to inflate said air bag when said collision indicative value becomes larger than a predetermined threshold higher than said low impact collision threshold, and to start applying a mitigating-secondary-collision-damage-brake-force to said host vehicle when and after said air bag is inflated.

* * * * *